United States Patent [19]

Gates et al.

[11] Patent Number: 5,073,819

[45] Date of Patent: Dec. 17, 1991

[54] COMPUTER ASSISTED VIDEO SURVEYING AND METHOD THEREOF

[75] Inventors: Jackson Gates, Kylertown; Robert L. Hawkins, Smithmill; Alan R. Larson, Kylertown; David A. Perove, Altoona; Michael A. Rudella, Winburne, all of

[73] Assignee: Computer Scaled Video Surveys, Inc., Kylertown, Pa.

[21] Appl. No.: 505,179

[22] Filed: Apr. 5, 1990

[51] Int. Cl.$^5$ .......................... H04N 7/18; H04N 7/00
[52] U.S. Cl. ..................... 358/107; 358/101; 356/397; 364/560; 395/121
[58] Field of Search ............... 358/107, 101, 109; 356/397; 364/517, 518, 560

[56] References Cited

U.S. PATENT DOCUMENTS

| | | | |
|---|---|---|---|
| 2,616,177 | 11/1952 | Bazhaw | 33/114 |
| 3,909,519 | 9/1975 | Page, Jr. | 358/107 |
| 4,005,932 | 2/1977 | Gates | 353/6 |
| 4,148,583 | 4/1979 | Gates | 356/2 |
| 4,396,942 | 8/1983 | Gates | 358/107 |
| 4,695,959 | 9/1987 | Lees et al. | 364/458 |
| 4,809,066 | 2/1989 | Leberl et al. | 358/107 |
| 4,929,843 | 5/1990 | Chmielewski, Jr. et al. | 358/107 |
| 4,988,189 | 1/1991 | Kroupa et al. | 358/107 |

OTHER PUBLICATIONS

Stereoscopy, N. A. Valyus, The Focal Press, N.Y., 1966.

Primary Examiner—John K. Peng
Attorney, Agent, or Firm—Eckert Seamans Cherin & Mellott

[57] ABSTRACT

One embodiment of the invention is a method of using a computer to assist a land based video survey. Initially, a video recording of a control location and a survey area is produced. The control location video includes at least a view of a baseline scale. Further, camera position data associated with the control location must be noted or stored in some manner. The computer converts the baseline scale from the control location video image to a video image scale. A survey video frame image of interest is selected and is displayed. One or more points of interest on the survey video frame is identified along with a predetermined baseline point obtained from a baseline scale image view overlaid on the survey video frame. In one embodiment, this identification step is conducted manually by an operator touching a touch sensitive pad having fine grid lines corresponding to pixel points in the video frame image. The distance between two identified points is calculated based upon the video image scale and the camera position data. An aerial survey is also disclosed wherein two video frames are selected and limited to different color bandwidths. Reference points are aligned by combining the two frames. Elevations are mapped based upon the spatial separation of images in the two frames.

20 Claims, 7 Drawing Sheets

COMPUTER ASSISTED VIDEO SURVEYING AND METHOD THEREOF

BACKGROUND OF THE INVENTION

The present invention relates to a computer assisted video surveying and method therefor.

Typical land based surveying methods involve measuring distances from a certain known point and noting the bearing and angle of declination or inclination of the sighting tool between the known point and a plurality of measurement sites. The data is generally obtained manually and then transferred to graphs, charts and maps of the surveyed area. The manual gathering of data is time consuming, labor intensive and hence costly. An aerial survey encounters the same problems as the land based manual survey.

U.S. Pat. No. 4,396,942 to Gates discloses a method and an apparatus for obtaining a video survey of an area. The system utilizes a video camera mounted on a vehicle. In one embodiment, a grid is placed on the front end of the vehicle in the field of view of the camera. A measurement of an object in the field of view is taken at a control location. The video film is played back and when image of the measured object falls within an overlay grid placed on the video monitor, the grid is marked such that the marked grid represents the actual size or dimension of the measured object. Accordingly, all objects displayed on the monitor and falling between the markings on the overlay grid have similar measurements compared with the known object as long as the video camera has not moved with respect to the vehicle. In another embodiment, the overlay has multiple distance scales which the Gates '942 disclosure states can be mathematically computed based upon a predetermined control position of the camera, the height of the camera, the focal length of the camera and the field of view of the camera. It has been found that additional parameters must be incorporated into the system in order to obtain a highly accurate video survey. Also, no precise provision is made for measuring objects distant from the point of observation and not directly framed by the grid on the front of the vehicle. If the object to be measured does not fall within the grid, it cannot be measured.

U.S. Pat. No. 3,909,519 to Page, Jr. discloses a measuring system employing a television camera tube which captures a video image of an object under observation. Reference lines are generated on a video monitor by counting pulses tracking the video signal stream. A plurality of uniformly spaced scale markings are scribed onto the camera tube which provides a reference baseline which is proportional to the object being measured by the video system. To calibrate the system a measurement is made of an object of known dimensions and the size of the video image of the object under observation is calculated based upon the correlation between the known object and the video image size of the object under observation. No provision is made for measuring objects in the field of view distant from the known object or correcting for depth perception of the objects to be measured. Accordingly, the Page system cannot correct for the size of objects distant from the know object.

U.S. Pat. No. 2,616,177 to Bazhaw discloses an apparatus and method of surveying elevations utilizing a still, photographic camera, with scale markings on its lens, and a rod having scale markings and an upper and lower target. The rod is placed in the field of view of the camera, the camera is held level, i.e., at 0 degrees declination, and a photo is taken. The rod is then moved a certain measured distance from the first position and another picture is taken. With these two pictures, the elevation differential between the two rod locations can be computed using image distances from (1) the lens scale to a point on the rod and (2) two points on the rod and using the focal length of the camera lens. The distance from the camera to the rod is similarly computed. Importantly, the camera must be level or set at a 0 degree declination.

U.S. Pat. No. 4,005,932 to Gates discloses a photogrammetric method and apparatus to eliminate relief distortion from aerial photographs and to produce orthostereoscopic photos of topography.

U.S. Pat. No. 4,148,583 to Gates discloses an orthostereoscopic plotter from which contour maps can be produced from orthostereoscopic slides or prints.

U.S. Pat. No. 4,659,959 to Lees et al. discloses a passive range measurement system which obtains stereo image pairs of a terrain. The image pairs are placed in registry by targeting a single object in both images. To register the two images, the displacement of the camera from point A, the first image observation location, to point B, the second image observation location, must be known. This is accomplished by using the velocity of the airplane and other measured movement parameters.

SUMMARY OF THE INVENTION

One embodiment of the invention is a method of using a computer to assist a land based video survey. Initially, a video recording of a control location and a survey area is produced. The control location video includes at least a view of a baseline scale. Further, camera position data associated with the control location must be noted or stored in some manner. The computer converts the baseline scale from the control location video image to a video image scale. A survey video frame image of interest is selected, displayed and digitized. One or more points of interest on the survey video frame are identified along with a predetermined baseline point obtained from a baseline scale image view overlaid on the survey video frame. In one embodiment, this identification step is conducted manually by an operator touching a touch sensitive pad having fine grid lines corresponding to pixel points in the video frame image. The distance between two identified points is calculated based upon the video image scale and the camera position data. The camera position data generally includes data sufficient to ascertain a horizontal plane distance between the baseline scale in the field of view of the camera at the control location and the camera. Additionally, the camera position data includes an angle of declination of the camera, that is, the declination of the camera below a horizontal plane through the lens of the camera. The distance calculation is based upon trigometric relationships between the actual distance of the camera and baseline at the control location and the screen distances on the video frame image between the baseline image point and the point of interest.

Another method of computer assisted video surveying utilizes an aerial video survey that includes a view of at least three known reference points. That video survey method includes the steps of selecting first and second video frames from the aerial video survey wherein the first and second frames include a view of the three reference points. Pixels in the first frame are converted to a first bandwidth and pixels in the second frame are converted to a second bandwidth. The first and second frames are manipulated, that is, rotated, shifted, compressed or stretched with respect to one another and combined until at least two of the three reference points are aligned and the combined first reference point falls within a predetermined bandwidth. An elevation of the first reference point is mapped to a map frame and the same elevation is mapped to the map frame for groups of pixels falling within a further predetermined bandwidth. The computer generates a video image elevation scale based upon a pixel image block deviation in the combined frame about the second reference point using the actual elevational differential between the first and second reference points. The pixel image block deviation is determined by optical character recognition techniques of the same object by comparing the spatial deviation between pixel image blocks of different bandwidths of that object. For example, if the first bandwidth is a red color range and the second bandwidth is a blue color range, the second reference point is represented by both a red and a blue pixel image block in the combined frame due to the parallax effect. By analyzing the spatial deviation between the blue and the red pixel image blocks about the second reference point, the parallax between the blocks is established and the screen distance between the red and blue images blocks is proportional to the actual difference in elevation between the first and second reference points. When the first and second frame are aligned and combined, the first reference point falls within a purple bandwidth, that is the combination of a red and a blue first reference point pixel image block. All other "purple" points in the combined frame are then at the same elevation as the first reference point. These are mapped to a map frame. By using the video elevation scale and the parallax between all other pixel image blocks, all the other points in the combined frame can be mapped according to elevation.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to computer assisted video surveying and a method therefor.

Figure 1:
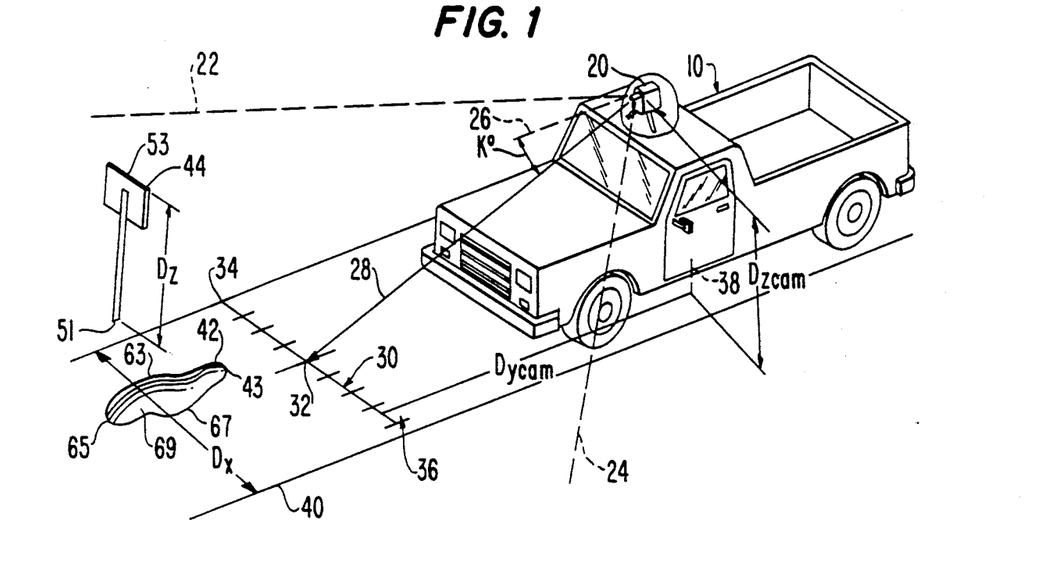
FIG. 1 illustrates a perspective view of the video camera at a control location and is illustrative of a survey area.

FIG. 1 diagrammatically illustrates a perspective view of a land based video survey. Vehicle 10 carries a video camera 20 having a field of view generally designated by dashed lines 22 and 24. The lens system in video camera is set at an angle of declination K degrees below a horizontal plane generally indicated by dashed line 26. The optical axis of the lens system is colinear with line 28 and is directed towards a baseline 30 at center point 32. Baseline 30 is a measured and marked line scale having a plurality of markings that are captured on the control location video image by the camera. For example, baseline 30 can show 1' increments and be 8' wide from outer point 34 to outer point 36. Baseline 30 is placed a horizontal plane a distance of $D_{ycam}$ from a vertical plane extending through essentially the film position or lens focal point of video camera 20. The vertical plane is perpendicular to the horizontal plane and vertical line 38 falls within the vertical camera plane. Camera 20 is positioned at a height $D_{zcam}$ above a horizontal plane in which baseline 30 is placed. Additionally, or in the alternative, the distance between the lens of camera 20 and baseline center point 32 is calculated or obtained. For example, the length of line 28 can be obtained by utilizing a laser associated with camera 20 which is reflected from baseline center point 32 back to a receptor near or at the point of emission of the laser light. Such electronic measurement devices are known in the art. Some of this data is necessary to calculate distances in the survey area videos. Accordingly, this information is called collectively herein "camera position data". The particular data necessary for each algorithm utilized to calculate actual distances from the video area survey are discussed hereinafter.

FIG. 1 is also illustrative of the video area survey assuming that baseline 30 is no longer in the field of view of video camera 20. Assuming baseline 30 was removed from the field of view depicted in FIG. 1, the survey area video would capture a video image of roadway 40 having an actual width $D_x$, of pothole 42 having various area and volume dimensions, and a sign 44 having a height $D_y$ and being spaced a certain distance from other points in the video image such as leading point 43 of pothole 42.

Figure 2A:
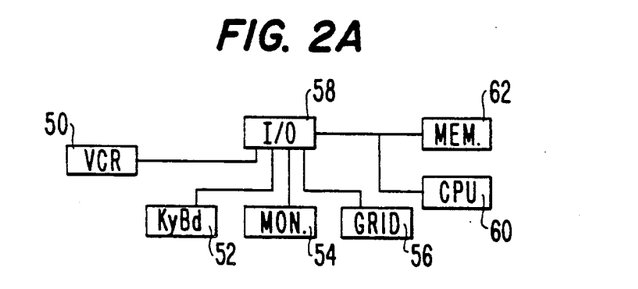
FIG. 2A is a block diagram of the hardware for the system.

FIG. 2 illustrates the hardware included in the computer used to conduct the video survey. The hardware includes a video player 50 (VCR), a keyboard 52, a monitor 54, a touch sensitive grid 56 and an input/output device 58. The VCR, keyboard, monitor and touch sensitive grid are connected to input/output device 58. A central processing unit 60 is connected to the input/output device as is memory 62. The interaction of these hardware components is discussed later in conjunction with the flow charts.

Figure 4:
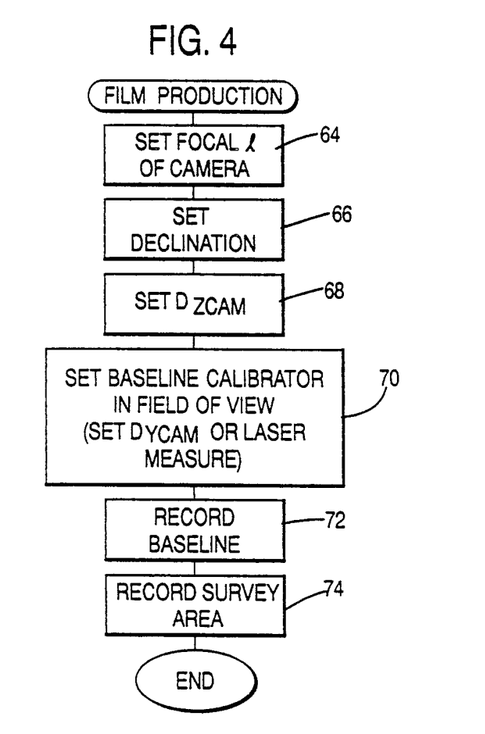
FIG. 4 is a flow chart illustrating the filming of the video survey.

FIG. 4 is a flow chart showing the steps involved in producing the video film. Step 64 sets the focal length of camera 20. Preferably, baseline 30 is in focus and optical axis 28 of video camera 20 is directed towards center point 32 of baseline 30. Step 66 involves obtaining the declination of camera 20 when the optical axis of the camera is directed towards center point 32 of baseline 30. Step 68 establishes the height of camera 20 $D_{zcam}$. In step 70, the baseline is placed in a control location and either the horizontal distance $D_{ycam}$ is established by moving the camera away from baseline 30 or the actual distance between camera 20 and center point 32 of baseline 30 is measured with a laser or other distance measuring device or is calculated from known information. The foregoing steps may occur concurrently since they depend upon the placement of the baseline. In step 72, the camera is activated and a video recording is made of the control location which includes capturing a video image of the baseline scale 30. In step 74, the video camera is further activated and the camera captures a video image of the area to be surveyed. This video image is a series of video frames and is called herein collectively "a survey area video". The video film which includes both the control location video and the survey area video is then placed in VCR 50 (FIG. 2) and played back into the computer system.

Figure 5A:
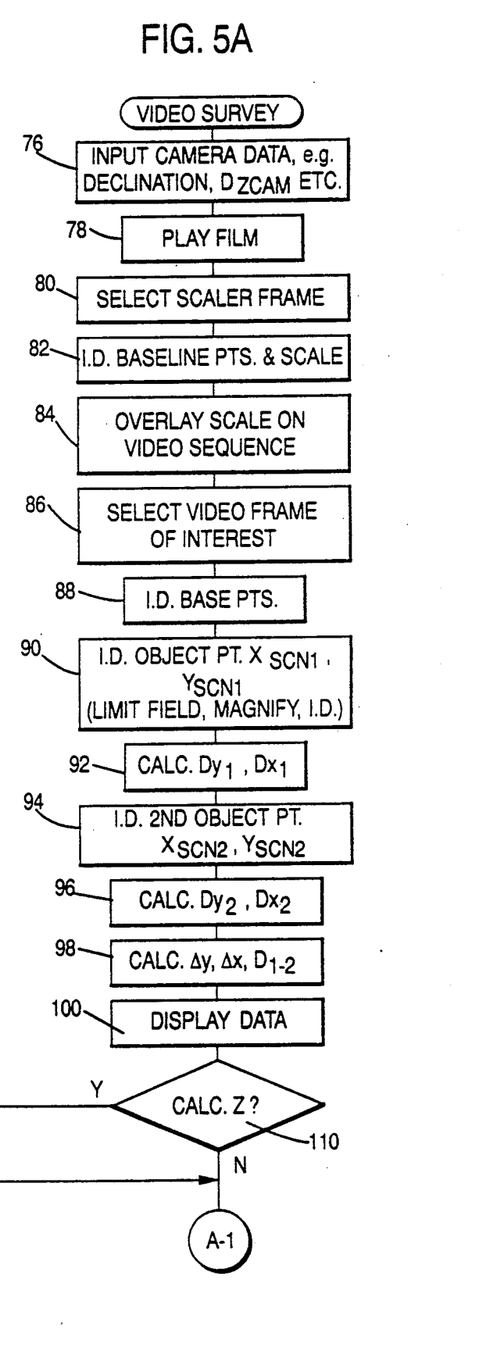
FIGS. 5A and 5B represent a flow chart of the computer assisted video surveying method.
Figure 5B:
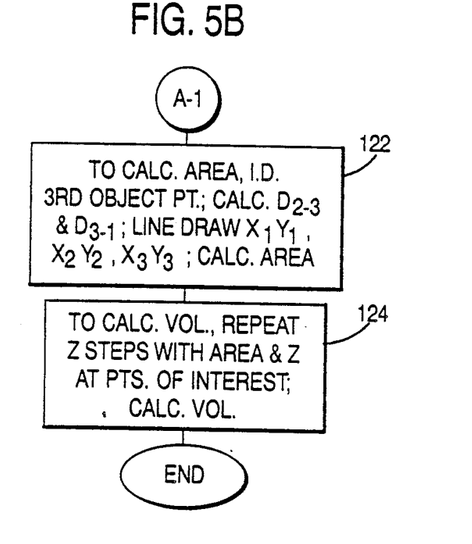

FIGS. 5A and 5B are a flow chart showing the principal steps in the computer assisted video land surveying system. In step 76, the camera data is input into the system. This data includes one or more of the following pieces of information, such as the declination of the camera K degrees, $D_{zcam}$, $D_{ycam}$, or the direct sight line distance between camera 20 and center point 32 of baseline 30. It has been found that $D_{zcam}$ and $D_{ycam}$ provide sufficient data for the system. This information could be input via keyboard 52 or could be electronically stored on the video film. A simple method of electronically storing this data could utilize the audio track of the video film using a standard coding for certain declinations, $D_{ycam}$, $D_{zcam}$, etc. Other ways to store camera data are available, such as simply noting these requirements during the shooting of the control location video. The operator of the computer system could then play the control location video and input this information into the computer via keyboard 52. If the audio coding method is utilized, the computer system must include a device to separate the audio track from the video signals and an electronic decoder having an analog to digital converter and a look-up table in memory 62 to compare the coded audio signals with the data in the look-up table and obtain the correct camera position data.

Figure 2B:
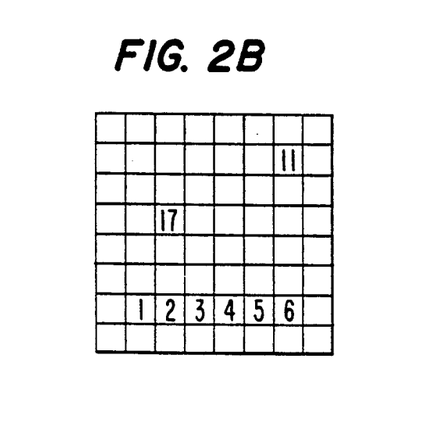
FIG. 2B illustrates an exemplary matrix of pixels.

In any event, the film is played back in step 78 and generally viewed by the operator on monitor 54. In step 80, the operator selects a scaler video frame from the control location video. This scaler video frame must include a video image of the baseline when camera 20 is immobilized at the location specified in the camera position data. In step 82, the operator identifies the baseline points and the computer generates a video scale. For example, if an 8' baseline 30 is utilized as illustrated in FIG. 1, the operator identifies the video screen pixels corresponding to outer points 34 and 36 and center point 32 and further input information into the computer for noting that an 8' baseline scale was used. A video image scale is calculated by the computer either by counting pixels between the image points corresponding to outer baseline points 34 and 36 or by assigning "units" to the video screen image (e.g., 1" screen units) and also by segmenting that video image scale line based upon the actual distance covered by that baseline scale. For example, in a preferred embodiment, the monitor is a high resolution monitor that displays 756 pixels wide by 486 lines. Accordingly, every video frame includes approximately 367,416 number of pixels. Returning to the example, if $D_{ycam}$ is 20' and the focal length of the lens is 10 millimeters and baseline 30 is 8' wide, all objects in the survey area video shown at the same location on the video frame as the baseline video image are proportional to the actual baseline scale dimension. In other words, any object spanning the baseline video image scale in a particular video frame is 8' wide ($D_x$) if the object is located at the same frame location as the baseline video image scale in the control location video. This crude measurement can be done electronically by loading each pixel from a particular video frame image into certain memory locations in memory 62. These memory locations can be thought of as forming a matrix with a pixel in each block of the matrix. Utilizing FIG. 2B as an example, assume that the control location video captured baseline 30 occupying blocks 1, 2, 3, 4, 5 and 6. Assume also that pixels 1 and 6 correspond to outer points 34 and 36 of baseline 30. By selecting any video frame of interest (step 86 in FIG. 5A), if that video frame of interest had an object that spanned pixels 1 through 6 and was located in the same frame memory location, that object would be 8' wide, that is, have a $D_x$ of 8'.

This technique of measuring an object on the baseline scale image is substantially similar to the technique disclosed in U.S. Pat. No. 4,396,942 to Gates. However, the Gates '942 patent did not utilize a computer. Also, the Gates patent could not accurately identify distances shown in the far field such as between an object spanning pixels 11 and 17 and laying a substantial y distance away from the baseline scale unless the overlay grid on the video monitor passed specifically through those points. The present system improves upon the Gates method as discussed hereinafter.

Rather than have the operator identify the baseline scale points as in step 82, if the baseline included unique markings, the computer could look for the markings using optical character recognition techniques, and generate the video scale without operator assistance.

In step 84 (FIG. 5A), the video scale is overlaid on the video frame sequence that is played by the operator from VCR 50 and displayed on monitor 54. In step 86, the operator selects a particular survey video frame image from the plurality of sequential video frames of the survey area video. In step 88, either the operator or the computer system itself identifies the baseline image points. In a preferred embodiment, the video scale, corresponding to the baseline image, is overlaid on the video frame image that is being analyzed by the operator. However, that is not essential since the computer has stored in memory 62 the pixel locations of the baseline video image as well as the various incremental points on that scale. In step 90, the operator identifies the object point of interest on the survey video frame of interest. Ideally this is done utilizing an extremely defined, touch sensitive grid 56 and viewing a cursor or cross-hair on monitor 54. Currently, the touch sensitive grid utilized in the system is a Sketch PRO, manufactured by Hewlett Packard of Texas, or the equivalent thereof. The operator moves a stylus over grid 56 and the computer moves the cursor on monitor 54 to various points. When the operator has visually identified the point of interest $X_{scn1}$ $Y_{scn1}$ on the video monitor and places the cursor over the point, the operator identifies that point by striking an appropriate control key. Preferably, the grid and stylus combination should be so sensitive that the operator could identify a single pixel 17 on the high definition monitor.

Since the survey video frame is only focused on items positioned at or near the baseline position, the objects at the baseline position are clearly depicted. The operator can pan the survey video frame and magnify a small portion of the frame to identify a particular object point. For example, the operator may wish to magnify the image in the 3×3 pixel region about pixel 17 FIG. 2B) in order to specifically and accurately pinpoint pixel 17. For example, without magnification each pixel depicting an object at 60' occupies about 4.5 to 5". If the video image was segmented or limited and a segment magnified, the accuracy of the system is improved because each pixel would depict smaller object segments, e.g., smaller than 5" at a 60' distance. The processing techniques used to limit the viewing field of the video image frame and magnify that limited target field are known in the art. In step 92, the computer calculates the distance from the identified point, e.g., pixel 17, to a predetermined baseline point, e.g., pixel 1. The identified screen point $X_{scn1}Y_{scn1}$ is a certain width, X, from a center line, a plane through line 28 and normal to the ground, and a certain distance Y away from the camera as well as from the video image scale. Returning to FIG. 2B, pixel 17 has a screen distance of 1x and 3y from baseline pixel point 1. As used herein, x refers to distances from left to right or right to left and y refers to distances away from the point of observation. Z refers to elevations.

In order to calculate the actual distance to an object point $D_{y1}$ and $E_{y1}$ several algorithms can be utilized. The algorithms are iteratively verified by visually confirming the computed x,y distances to known distances on a video frame image of a multiplicity of transits. A plurality of transits were set in a matrix and placed throughout the entire field of view of the camera. Equally spaced columns of transits converge on a vanishing point in the video frame image. Although transit image points converge towards the vanishing point, all the points aligned on an identified transit column ar known to be spaced a pre-established x distance horizontally away from a center line running from the camera through the vanishing point. Since the distance from the camera ($D_{ycam}$) was known for each row of transits in the matrix, the operator verifies the result obtained by the algorithms with the known x,y coordinates for those transits.

Accordingly, the operator need only input a baseline length (34 to 36, FIG. 1) and the video location of the baseline on the scaler or control video frame and input $D_{zcam}$ and $D_{ycam}$ (or other similar camera data) to normalize the survey video scale. Of course, the accuracy of measuring the X or horizontal distance from the center line diminishes the farther away the object is from the camera. At the vanishing point, one cannot in any respect accurately measure a distance X. However, using the following algorithms, measurements have been made at 60' from the baseline within 3" of the true location of the object.

The algorithm for measuring (see FIG. 3A) utilizes a computer program to convert the pixels of the video frame into a square grid measurement for the X-Z plane video plane image 508. The camera height $D_{zcam}$ (Ch in FIG. 3A) and the distance $D_{ycam}$ (b in FIG. 3A) from the camera 506 to the baseline 510 are known.

Figure 3A:
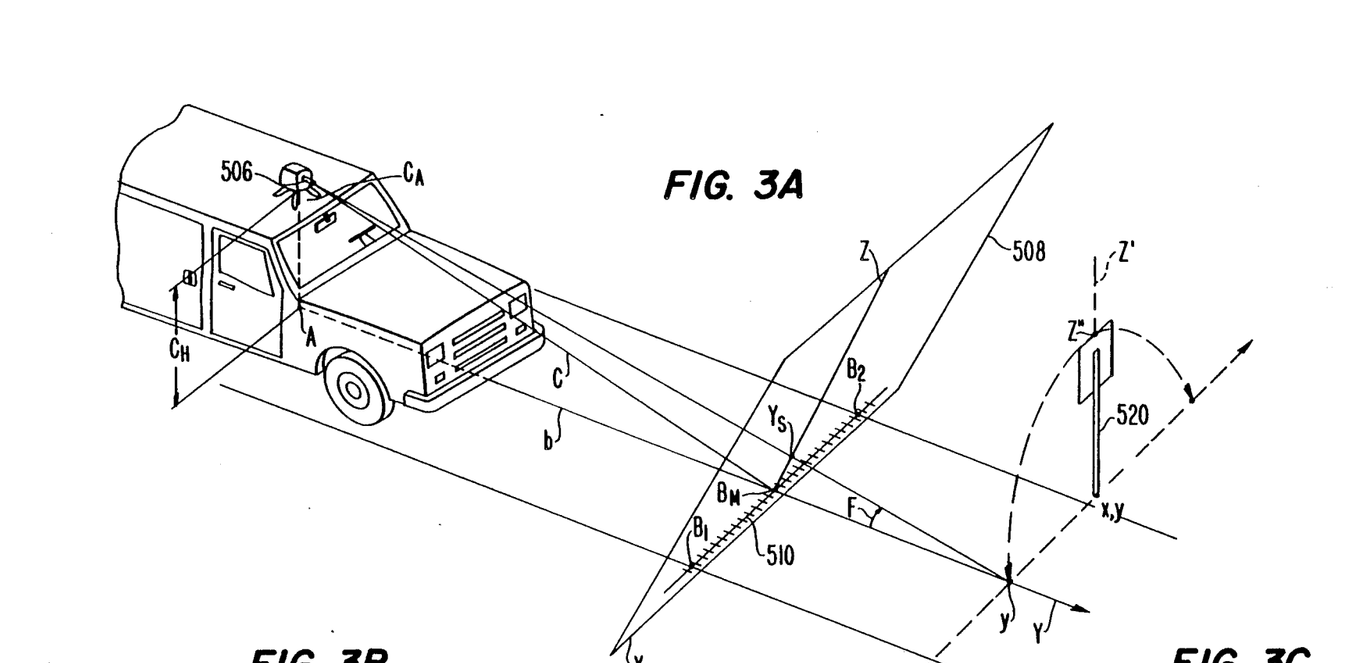
FIGS. 3A, 3B and 3C graphically illustrate methods of computing x, y, z distances in the computer assisted video surveying system.

An actual distance, $\overline{B1B2}$, is known as baseline 510 and extends in the X-direction on the X-Z plane 508. The image, and hence the computer, depicts and identifies this footage distance as N-units. This distance is then converted into a Units per foot ratio:

$$\frac{\overline{B1B2}}{N}$$

Since the computer display shows only two dimensions, that is the X-Z image plane 508, the screen image distance of point y appears on the X-Z image plane as the screen distance $\overline{YsBm}$. The computer reads this distance in units by the operator touching a probe on points Bm and Ys, respectively, the screen image points of the baseline center point and point y. This in amount $\overline{YsBm}$ screen units is converted to actual feet by the formula:

$$\text{Actual } \overline{YsBm} = \left(\frac{\overline{B1B2}}{N}\right)(\overline{YsBm} \text{ Units})$$

Figure 3B:
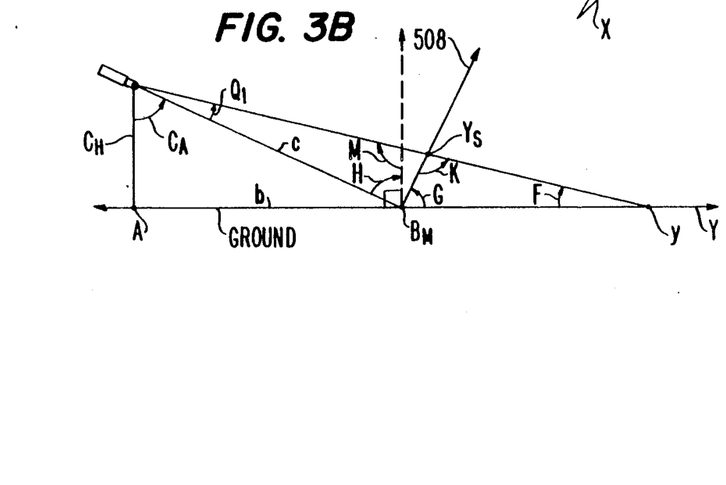

Then, the computer determines $\overline{yBm}$ in the following process:

First solve for the camera angle Ca (equal to declination K in FIG. 1) by solving the right triangle between the camera, point A (see FIG. 3B) and point BM.

$$c = \sqrt{Ch^2 + b^2} \quad Ca^\circ = \text{ATAN}\frac{b}{Ch}$$

The following series of calculations are then made:

$$Q1 = \text{ATAN}\frac{\text{Actual }\overline{YsBm}}{c}$$

$\angle G = \angle H = Ca$ $\angle M = 180 - \angle H - Q1$ $\angle F = \angle M - 90°$ $\angle K = 180 - \angle G - \angle F$ $$yBm = \frac{(\text{Actual }\overline{YsBm}\,(\text{SIN}\angle K)}{\text{SIN}\angle F} = \text{actual } y \text{ distance from baseline.}$$

If the line $\overline{yBm}$ is the known distance then the line $\overline{YsBm}$ can be computed as follows:

First, solve the right triangle bound by the camera, point A and point y, for $\angle F$.

$$\angle F = \text{ATAN}\frac{Ch}{b + yBm}$$

$\angle G = Ca$
ti $\angle K = 180° - \angle F - \angle G$ $$\text{Actual } \overline{YsBm} = \frac{(\overline{YsBm}\,(\text{SIN}\angle F)}{\text{SIN}\angle K}$$

$$\overline{YsBm} \text{ Units} = \frac{\text{Actual }\overline{YsBm}}{\frac{\overline{B1B2}}{N}}$$

Figure 3C:
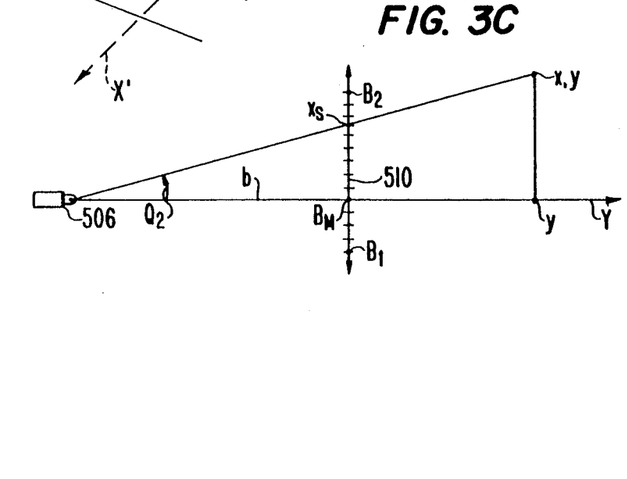

To calculate a horizontal distance X for point X,Y on the horizontal X or ground plane, reference is made to FIG. 3C.

Again, $\overline{B1B2}$ is a known distance, in feet, on the baseline 510. The computer identifies this distance in N units on the video image. The distance is then used to create a units per foot ratio:

$$\frac{\overline{B1B2}}{N}$$

$$\text{Actual } XsBm = \left(\frac{\overline{B1B2}}{N}\right)(\overline{XsBm} \text{ Units})$$

The computer program then converts the pixels in the video image into square grid measurements. Line $\overline{yBm}$ was calculated previously $$Q2 = \text{ATAN} \frac{\text{Actual } \overline{XsBm}}{b}$$

$$\overline{xy} = \text{TAN } Q2 \, (b + \overline{YBm})$$

where $\overline{xy}$ = actual distance from point x,y to point y on the center line.

If the actual $\overline{xy}$ (from point x,y to point y) is known or a desired distance is wanted out from point y, then to convert the actual distance to units at the baseline:

$$Q2 = \text{ATAN} \frac{\overline{xy}}{b + \overline{yBm}}$$

$$\text{Actual } XsBm = (b) \text{ TAN } Q2$$

$$XsBm \text{ Units} = \frac{\text{Actual } \overline{XsBm}}{\left(\frac{\overline{B1B2}}{N}\right)}$$

To calculate height from the video image, reference is made to FIG. 3A. Since the computer display device only shows the X-Z image plane 508, the distant objects are displayed in perspective in the Z plane as are elevational aspects (Z or height) of those distant objects.

To measure a height Z″ above point x,y along axis Z′, the height is measured on the same scale as horizontal or X-axis measurements. The reason for this is simply that the perpendicular object (sign 520) is at a known distance (y) from the baseline 510. No part of a stationary object is at a further y value other than the width of the object itself.

To determine the height of sign 520, first determine distance point y by calculating $\overline{YBm}$, then determine x by calculating $\overline{xy}$.

To determine the location of point z″, the operator identifies point z″ with a cursor and the computer determines $\overline{xz}$ units of height. The computer rotates sign 520 in the X′Z′ plane and calculates $\overline{xz}$ distance as if it were an $\overline{xy}$ and converts xz to an actual distance (or height) at the baseline ($\overline{XsBm}$).

Returning to FIGS. 5A and 5B, in step 94 the operator identifies a second object point $X_{scn2}Y_{scn2}$ on the screen. In step 96, the computer calculates $D_{y2}$ and $D_{x2}$. In step 98, the computer calculates delta Y and delta X which is the distance from $X_1Y_1$ and $X_2Y_2$ ($D_{1-2}$) In step 100, the monitor displays the distance $D_{1-2}$ on the monitor.

Decision step 110 ascertains whether an elevation or Z should be calculated. If so, the operator selects the appropriate control key and the yes branch is taken to step 112. In that step, the operator identifies the lower point $Z_{scn1}$ on the screen at $X_{scn1}Y_{xn1}$. This may correspond to point 51 in FIG. 1 which is the lower point of sign 44. In step 114, the operator identifies the upper point of the object on the screen $Z_{scn2}$. This corresponds to point 53 on sign 44 in FIG. 1. The computer then obtains the screen distance which is delta $Z_{scn}$ by subtracting $Z_{scn2}$ and $Z_{scn1}$. In step 118, the computer calculates delta Z as discussed above. Calculating $D_z$ by using the $D_x$ algorithms identified above. Thereafter, the computer returns to the no branch from decision block 110. Essentially, in order to determine the height of any object in the video frame of interest, the computer rotates the video image scale of the object and calculates the height as if that height were an X distance.

Step 122 generally describes the calculation of an area in the video frame of interest. Since the operator has already identified $X_1Y_1$ and $X_2Y_2$, the operator must further identify $X_3Y_3$ in order to calculate an area bound by those three identified points. Note in step 98 the computer has already calculated $D_{1-2}$. Therefore, after the operator identifies $X_3Y_3$, the computer can calculate $D_{2-3}$ and $D_{3-1}$, draw a line between $X_1Y_1$, $X_2Y_2$ and $X_3Y_3$, and then calculate the area bounded by that triangular region. To be more specific, in FIG. 1, assume that the operator would like to calculate the road surface area of pothole 42. Further assume that the operator has identified leading point 43 of the pothole as $X_1Y_1$. The operator then identifies right-hand boundary point 63, lagging boundary point 65 and left-hand boundary point 67. The area bound by lines connecting points 43, 63, 65 and 67 approximates the road surface area of the pothole. In step 124, a brief description of calculating volume is identified. Again returning to the pothole example in FIG. 1, assuming that the road surface area of pothole 42 has been approximated by points 43, 63, 65 and 67, the volume calculation could be estimated by the operator by identifying a depth approximated at point 69 in the pothole. After the operator identifies depth point 69 as being the lowest point to determine elevation and identifies, for example, a point level with the surface of pavement 40, the computer estimates the depth elevation Z of the pothole. After calculating the elevation, a simple volume calculation is executed by the computer using the road surface points and the depth point.

The computer assisted video surveying can also operate on a single photograph that has been scanned or otherwise converted to a digitized video frame image. With a single video frame image that represents a photograph, the unknown factors are the height of the camera $D_{ycam}$ and the focal length of the lens in the camera. An illustrative example of such a system would be the analysis of a photograph of an accident scene. The photograph can be digitized into a video frame image using known devices and methods. The computer must have at least the video frame image and baseline scale data corresponding to that video frame image. The unknown information is the height of the camera $D_{ycam}$ and the focal length of the camera and the declination of the camera and the distance of the camera from the particular object of interest in the photograph. The video frame image must have corresponding baseline scale data in order to be processed by the computer assisted video surveying method. The baseline scale data is obtained by, in this example, manually measuring certain distances at the accident scene as shown in the video frame image. The baseline scale data is the actual measurement of an object parallel to the lower edge of the picture and, hence, the lower edge of the video frame image. Further, another measurement must be taken of an object substantially perpendicular to the first measurement.

Returning to FIG. 1 as an example, assuming that a camera took a picture at a position identical to video camera 1 with a field of view spanning dashed lines 22 and 24. The corresponding baseline data for that video frame image would be the measurement of roadway 40 substantially parallel to baseline 30, such as $D_x$, as well as the Y distance between baseline 30 and the base of sign post 44.

By utilizing this baseline data, a video image scale can be obtained utilizing substantially the same calculations and algorithms as described earlier, except in reverse order. The photograph is scanned and digitized and video frame image is displayed on the monitor. The operator inputs the baseline scale data and identifies one or more points of interest on the video frame image in order to calculate the distance between the two identified points of interest based upon the video image scale and the baseline scale data. The baseline scale data can be utilized to obtain the distance the camera is from the baseline $D_{ycam}$ as well as the declination of the camera and any other information that was generally identified earlier as camera data position.

Figure 6:
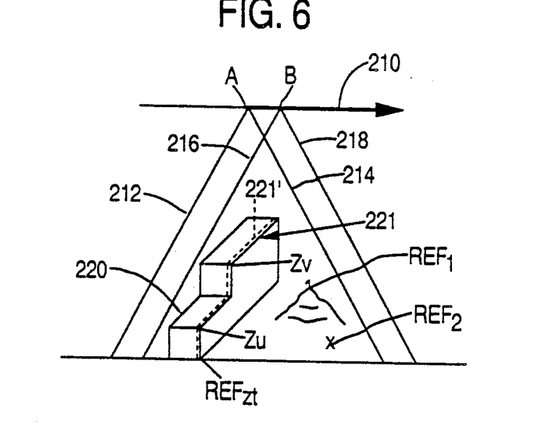
FIG. 6 diagrammatically illustrates the aerial video survey.

The computer assisted video surveying system can also be configured for a aerial video survey. FIG. 6 diagrammatically illustrates an aerial survey wherein a plane or helicopter flies over a survey region in the direction 210 and obtains a sequential plurality of video frames of the area to be surveyed, that is, an aerial video survey. Particularly, video frame A captures the images diagrammatically shown between lines 212 and 214 and video frame B captures the images between lines 216 and 218. Video frames A and B are simply two frames out of the plurality of sequential video frames in the aerial video survey. The video frames must capture at least three known reference points having known coordinates such as latitude, longitude and elevation, that is, reference points 2 and 3 must include X, Y and Z coordinates. The following Aerial Coordinate Table is exemplary of this data:

| Aerial Coordinate Table | | |
|---|---|---|
| Ref. No. | Coordinate | FIG. 6 ID. |
| REF. 1 | $X_1Y_1Z_1$ | REF. 1 |
| REF. 2 | $X_2Y_2Z_2$ | REF. 2 |
| REF. 3 | $X_3Y_3Z_3$ | $REF_{ZT}$ |

FIG. 6 shows a building 220 having different elevations, thereon, a first reference point ($REF_1$) at a higher elevation compared with a third reference point ($REF_{ZT}$) at the building, and a second reference point $REF_2$ (designated by "X" in the figure).

Building 220 has various elevational planes which will assist in understanding the parallax algorithm used in conjunction with the aerial video survey program. Reference point 3 is $REF_{ZT}$ which is the lower point of building 220, the next higher marked elevation on building 220 is $Z_u$ and the highest point of building 220 is $Z_v$.

Figure 7A:
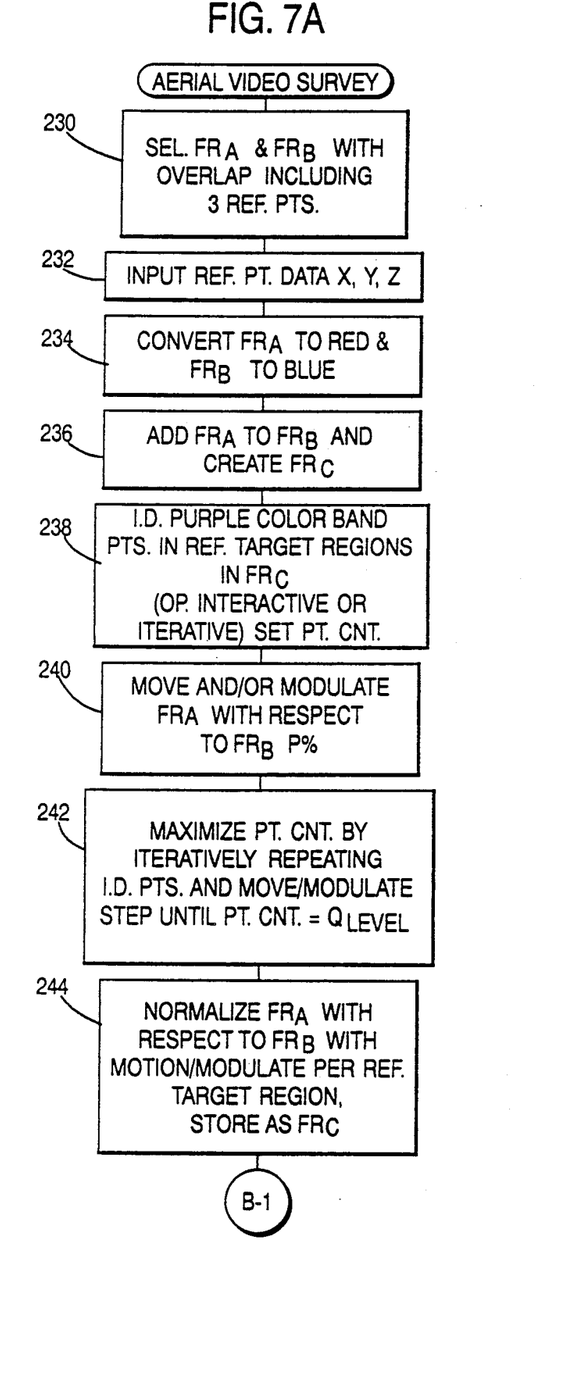
FIGS. 7A and 7B are flow charts illustrating the computer assisted aerial video survey.

In step 230 of the aerial video survey program in FIG. 7A, the operator selects frame A and frame B ($FR_a$ and $FR_b$). Both frames overlap and include the three known reference points. Frames A and B are relatively close to each other, that is, about 7-30 frames apart. In step 232, the operator inputs the reference point data for each of the three reference points $X_1Y_1Z_1$, $X_2Y_2Z_2$ and $X_3Y_3Z_3$. In step 234, the computer converts frame A to a red color scale and frame B to a blue color scale. To accomplish this, the first and second video frames are digitized and the information in each frame is converted to different bandwidths. A first bandwidth is used for the first frame. The first bandwidth is a range of the red color pixel values. Alternatively, a different color value range could be selected for the first bandwidth. Accordingly, when converted, frame A is displayed on the monitor, the video frame is shown in shades or brightness levels of red. The second frame is converted to a second bandwidth corresponding to the color blue. Different bandwidths could be selected but red and blue are preferred. In step 236, converted frames A and B are combined or added together to obtain a combined or composite frame C ($Fr_c$). In steps 238, 240, 242 and 244, frame A is moved with respect to frame B until the combined frame C has frame A in registration over frame B. In step 238, purple color band or bandwidth points are identified in a reference target region in frame C. This is either an operative interactive step or machine process step. In the operator interactive method, the operator moves a target window about the monitor with an appropriate controller from the keyboard or optional cursor control and places the target window about one of the reference points illustrated on the combined frame in a purple or near purple color. Purple, or its equivalent if other color value ranges are used, is the combination of the first and second bandwidths or red and blue colors. A purple pixel or group of pixels about a selected reference point is generated when the reference points in frames A and B are generally aligned or in registration. Purple is a predetermined bandwidth for the registration routine. The operator first moves frames A and B until the reference points are generally aligned. Then by focusing his or her attention on the target window about one of the reference points, the operator further moves the frames until the selected reference point becomes a certain shade or intensity of "purple", that is, the combined reference point falls within a predetermined bandwidth. The entire combined frame is then accordingly altered by the A-B movement of the target region.

As an alternative to the operator interactive subsystem, the computer could search frame C in certain multiple target areas to determine the highest purple point count within the defined target areas. The target area with the highest purple point count is placed on top of the stack of target area identifiers and the point count is set as a threshold. In step 240, the computer or the operator moves or modulates frame A target area with respect to frame B target area thereby changing composite frame C a certain percentage. "Movement" is defined as movement in either X or Y direction or a rotation of one frame with respect to the other frame. "Modulation" refers to the expansion or contraction of frame B with respect to frame A such that the points on the frame move apart or together a proscribed distance either in the X or Y directions. In contrast to the land based video survey, the following description of the aerial video survey program utilizes X and Y in manner similar to latitude and longitude of the points since the aerial video survey film is shot essentially straight down towards the land mass being surveyed. Similar areas in frame A and frame B are moved and modulated a certain P percent in step 240. In step 242, the computer maximizes the purple point count by iteratively repeating the identification of purple points, that is pixel values falling within the predetermined bandwidth (purple), and then repeating the move/modulation step with smaller percentages of movement or modulation (less than P%) until the purple point count equals or exceeds a threshold level ($Q_{level}$) in the designated area. When frame A has been moved or modulated with respect to frame B such that threshold level Q has been exceeded in the target area, the entire frame A is normalized with respect to frame B in step 244 and, hence, placed in registration with frame B such that at least one reference target region shows a reference point matching the predetermined bandwidth and having a certain intensity of color purple. At that time, any distortions in the combined frame C have been removed. The distortions are due to shifting of the aircraft during production of the aerial video survey.

In step 246, the combined or composite frame C is displayed and the operator confirms the proper registration of the reference points. In step 248, the computer calculates the video image scale for X and Y scale and screen dimensions with the pixel or screen distances and the actual distances between reference points. Again, this can be done by having the computer search for pixels or groups of pixels falling with a certain color bandwidth. The computer then identifies where the reference points are located in frame C and the operator confirms the accuracy of the computer identification. Since the reference point data was entered earlier into the computer, the computer calculates the actual distance between reference point 1, reference point 2 and reference point 3. By computing the pixel or screen distance between each of these reference points in the combined frame C, a video scale can be obtained thereby mapping each pixel frame location on the composite frame to a certain XY longitudinal and latitudinal location on a map. The XY coordinates for each pixel can be stored into a map frame.

In step 250, the computer searches for all purple points in the composite frame C or points falling within the predetermined bandwidth similar to the reference point used to register the frames on in steps 238, 240, 242 and 244. All points having the same purple intensity as, for example, reference point 1 used to register the frames are at the same elevation because the frames have been aligned to remove any parallax distortion of reference point 1. Rather than analyzing composite video frame C on a pixel by pixel basis, it may be necessary to analyze the frame by grouping pixels. A group of pixels may be a block of four or 10 pixels. In any event, whether the analysis occurs on a pixel by pixel basis or on a group pixel basis, the elevation of those points are the same if they all fall within the predetermined pixel bandwidth. Accordingly, elevation data for those points or pixel groups can be mapped to the map frame. The marking of the purple points in step 250 is the same as the mapping the points to a map frame.

In step 260, the computer identifies red points in a certain target area identified in the flow chart as target area 2. The red points in area Z correspond to a pixel image block generated by frame A pixels that does not overlay the same pixel image block generated by frame B pixels. If these image blocks did overlay, a purple color would result. The image blocks represent visually identifiable objects in frame C. Referring to FIG. 6, the red points are represented by the solid line near point $Z_v$. The pixel image block near $Z_v$ is the top roof line of building 220. By identifying the red roof line points in step 260, the computer in step 262 draws a line between red points that are near one another to substantially show the solid line 221 in FIG. 6. In step 264 the computer identifies the blue points in target area 2 about, for example, the building. Here again, the blue points are represented by the dashed line in FIG. 6. The blue points represent the pixel image block for the roof line generated by frame B but due to parallax distortion, the roof line from the perspective of point B has shifted. The shift between the red and the blue pixel image blocks is the parallax shift for that object. Therefore, in FIG. 6, the dashed line 221' is the parallax shift of the upper right-hand roof line of building 220 from the perspective of observation point B as shown in frame B. In step 266, the computer draws a line between the identified blue points. Decision step 268 determines whether there is sufficient correlation between the two image blocks. This is accomplished by optical character recognition techniques. If the correlation does not fall within M%, the no branch is taken and the computer in step 270 changes the target area to a different target area and the computer reprocesses that target area to determine when two image blocks have been identified and correlated or matched within a certain probability. As used herein, an "image block" is a group of pixels that forms an identifiable image.

If the red and blue image blocks do correlate within a certain percentage, the yes branch is taken from decision step 268 and in step 272 the computer measures the screen distances between the red and blue image blocks. This is a pixel image block deviation in combined frame C for that elevation. The pixel image block deviation is represented by $S_d$. It is well known that the parallax effect is different at different elevations. Therefore, pixel image block deviation $S_d$ can be arbitrarily set to a elevation marker $Z_d$. In step 274, the process is repeated with target area 3 in combined frame C where area 3 is not equal to area 2. Essentially, the computer repeats steps 260, 262, 264, 266, 268, 270, and if necessary, step 272. In step 276, a pixel image block deviation $S_e$ is identified and set equal to a second elevation marker $Z_e$. In step 280, the computer establishes elevational gradients between these two pixel image block deviations by correlating $S_d$ and $S_e$ with $Z_d$ and $Z_e$. In step 282, the computer repeats this process establishing gradients for all the pixel image blocks in the entire combined frame C. Eventually, a deviation $S_n$ will be found which maps to one of the reference points. Once that occurs, the arbitrarily associated elevational markers can be recalculated based upon that reference point correlation at $S_n$ and then in step 284, all of the elevations for all of the image blocks or pixels can be mapped to frame $F_m$ and normalized to the elevation identified by one of the reference points. Accordingly, the result of the aerial video survey is a map frame M which includes the X, Y and Z coordinates for all the pixels or the groups of pixels. A contour map can be generated by line drawing between points having similar elevations. Alternatively, the combined frame C can be viewed by the operator using red and blue color glasses since that frame is a corrected orthostereoscopic image as generally discussed in U.S. Pat. Nos. 4,005,932 to Gates and 4,148,538 to Gates.

Figure 7B:
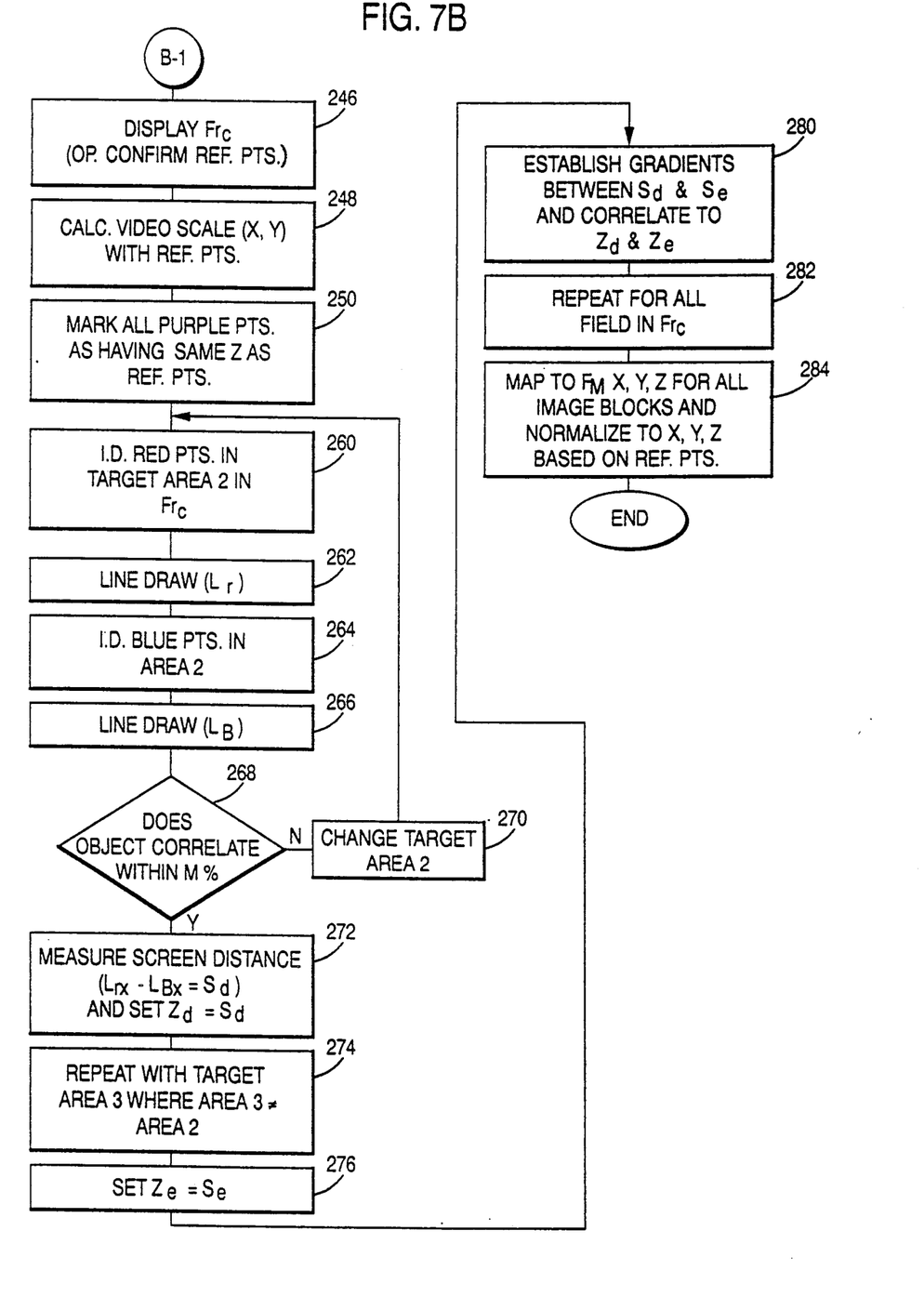
Figure 8:
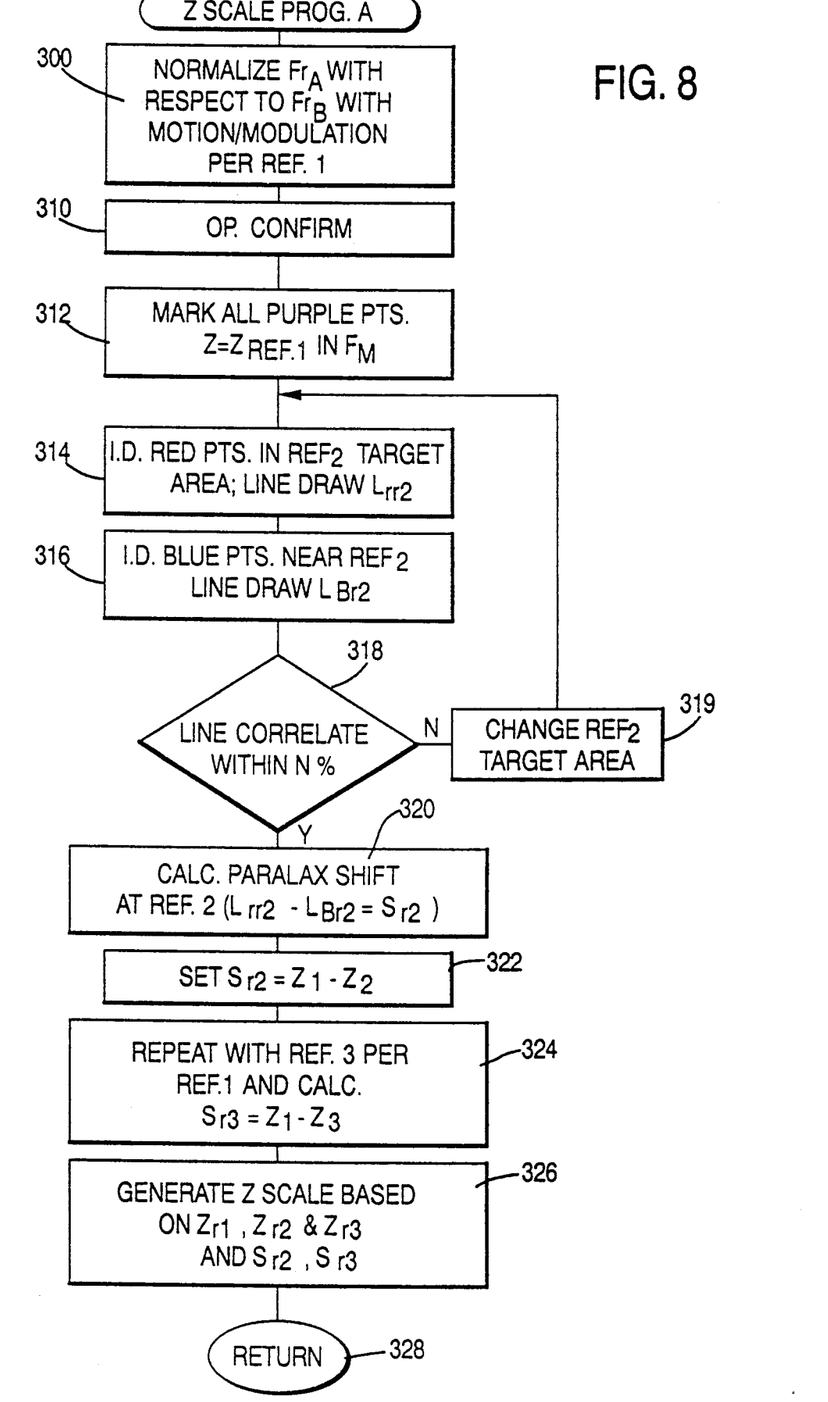
FIG. 8 is a flow chart illustrating the steps in producing an elevation scale for the aerial video surveying system.

FIGS. 8 and 9 show modifications of the elevation scale generation routine for the aerial video survey discussed earlier. FIG. 8 shows a first Z image scale program A in which step 300 involves normalizing frame A with respect to frame B with motion and modulation involving reference point 1 or at least a group of pixels about and including reference point 1. In step 310 the operator confirms that frame C has been properly aligned using reference point 1 as the starting or focal point. In step 312, the computer marks all purple points in frame C and sets those purple points equal to the elevation of reference point 1. Those elevations are mapped to mapping frame M. In step 314, the red points are identified at and about reference point 2 in a target area surrounding reference point 2. The computer then draws a line connecting the red points ($L_{rr2}$) in that target area about reference point 2. In step 316, the computer identifies the blue points in the target area about reference point 2 and draws a line connecting those blue points ($L_{br2}$). Decision step 318 determines whether $L_{rr2}$ and $L_{br2}$ correlate within a certain N percent. If they do not correlate within that percentage, the no branch is taken and the target area is changed about reference point 2. The program then re-executes steps 314 and 316. If the correlation is within the N percent, the yes branch is taken and the computer in step 320 calculates the parallax shift at reference point 2. This parallax shift is the difference between $L_{rr2x}$ and $L_{br2x}$ for the X shift and $L_{rry2}$ and $L_{br2}$ for the Y shift. That parallax shift is set to a screen value $S_{r2}$. In step 322, that screen difference parallax is set equal to the actual elevation difference $Z_1$ and $Z_2$. In step 324, the computer repeats the process with respect to reference point 3, that is, the computer repeats steps 314, 316, 318, 320 and 322. Accordingly, a screen difference parallax is obtained $S_{r3}$ which is equal to the actual elevation difference between the first and third reference points ($Z_1$ and $Z_3$). In step 326, the computer generates an elevation video image scale based upon the actual elevation differentials between the three reference points ($Z_{r1}$, $Z_{r2}$ and $Z_{r3}$ and the two screen differentials $S_{r2}$ and $S_{r3}$. In step 328, the program returns back to the main aerial video survey routine. Particularly, the elevation scale program in FIG. 8 is inserted or executed immediately prior to step 282 in FIG. 7B.

Figure 9:
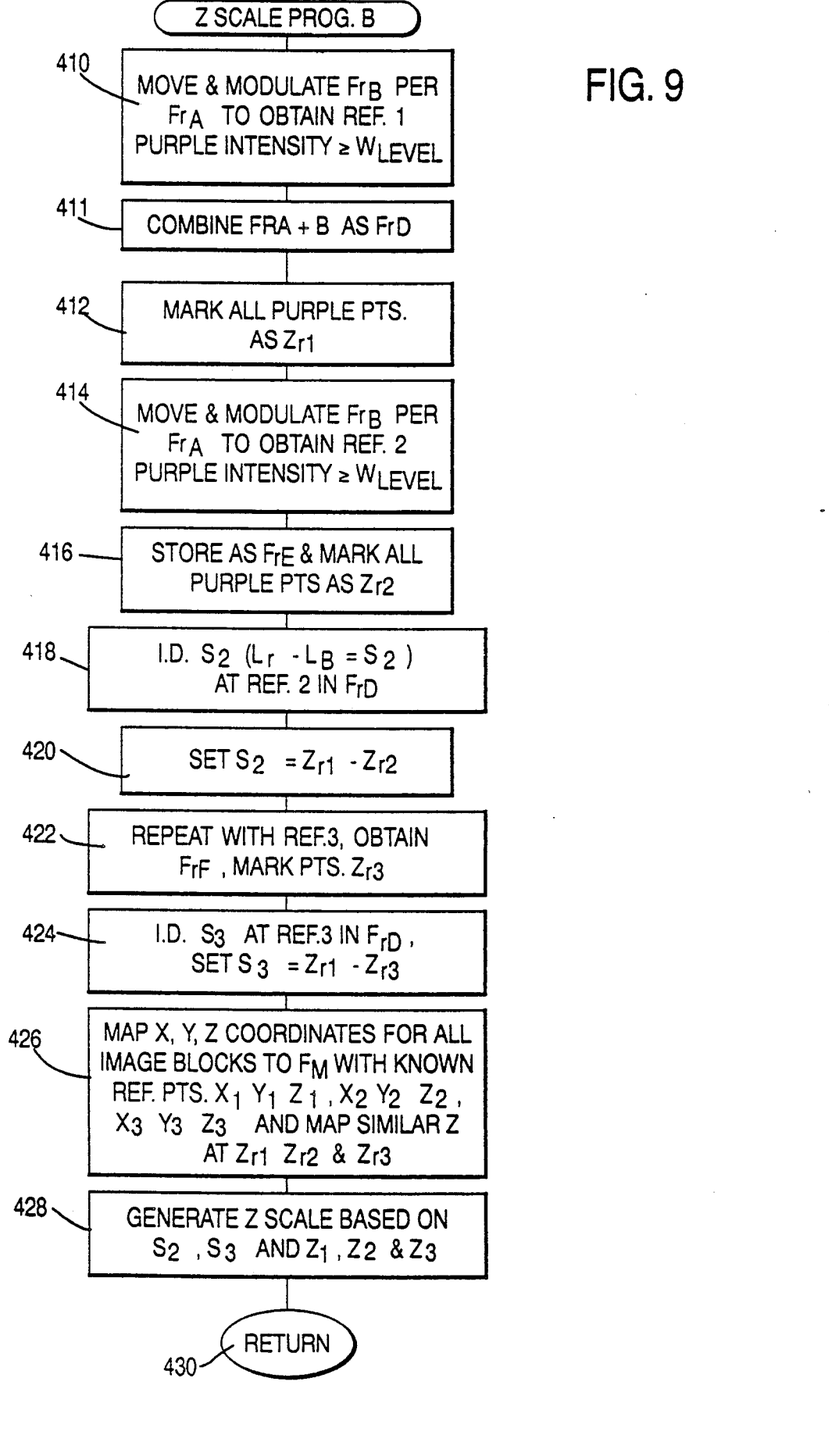
FIG. 9 is a flow chart showing an alternative technique for obtaining the elevation scale for such a survey.

FIG. 9 shows another elevation video image scale program. It begins with step 410 which moves and modulates frame B with respect to frame A to obtain a reference point 1 in the purple bandwidth having an intensity greater than a predetermined level $W_{level}$. In step 411, frames A and B are combined into a frame D ($FR_d$). In step 412, all the purple points in frame D are marked or mapped as having an elevation similar to reference point 1 ($Z_{r1}$). In step 414, frames B and A are modulated, independent of the modulation in step 410, such that reference point 2 exceeds a purple intensity level set at W. In step 416, frames A and B are combined and stored as frame E. All points having a purple intensity similar to the second reference point are marked as having the same elevation as in the $Z_{r2}$ map frame M. In step 418, a pixel image block deviation $S_2$ is obtained by comparing the red image blocks about reference point 2 and the blue image blocks about reference 2 in frame D. Frame D was independently generated in step 411. Step 420 correlates the pixel image block deviation $S_2$ to the actual elevation deviation between the first and second reference points, that is, the differential between $Z_{r1}$ and $Z_{r2}$. In step 422, the computer repeats the process with respect to reference point 3 and obtains frame F. This includes steps 414, 416. All the purple points in frame F are marked as having an elevation similar to reference point 3, i.e., $Z_{r23}$. In step 424, the computer sets pixel image block deviation $S_3$ at reference point 3 in frame D equal to the actual elevation differential between the first and third reference points, $Z_{r1}$ and $Z_{r3}$. In step 426, the XYZ coordinates for all the image blocks are mapped to frame M for the known reference points. Additionally, similar elevation points are mapped to frame M. An elevation scale is produced using pixel image block deviations $S_2$ and $S_3$ obtained in steps 420 and 440 and the actual elevation deviations between the first and second reference points and the first and third reference points. The computer has then established an elevation video image scale comparing the screen parallax to the actual elevation differences and can map all the elevations from all the pixels or pixel image blocks to the mapping frame based on the parallax shift of pixel image blocks in combined frame C. The video elevation scale is generated in step 428. In step 430, the program returns to step 284 in the main program where all the image pixels or pixel image blocks are identified and their elevations are mapped to frame M using the video image scale obtained in step 428.

The claims appended hereto are meant to cover modifications and change within the spirit and scope of the present invention.

What is claimed is:

1. A method of computer assisted video surveying comprising the steps of:
    producing a video recording of a control location, thereby providing a control location video, and of a survey area, thereby providing a survey area video, wherein the control location video includes at least a view of a baseline scale, and storing camera position data associated with said control location;
    converting said baseline scale to a video image scale using said control location video;
    selecting and displaying a survey video frame image of interest from the survey area video;
    identifying one or more points of interest on said survey video frame and a predetermined baseline point obtained from said view of said baseline scale; and,
    calculating at least one distance between two identified points based upon said video image scale and said camera position data.

2. A method as claimed in claim 1 wherein said camera position data includes data sufficient to ascertain a horizontal plane distance between said baseline scale and said camera at said control location.

3. A method as claimed in claim 1 wherein said predetermined baseline point is fixed within each frame of said survey area video.

4. A method as claimed in claim 1 wherein said camera position data is stored independently of the production of said control location video.

5. A method as claimed in 4 wherein said camera position data is obtained by determining the declination of said camera and determining the direct line distance between the camera and said baseline scale at said control location.

6. A method as claimed in claim 1 wherein the step of identifying includes the step of displaying a portion of the previously displayed survey video frame image and magnifying that portion prior to identifying said point of interest.

7. A method of computer assisted surveying using at least a video frame image and baseline scale data corresponding to said video frame image comprising the steps of:
   generating a video image scale using said baseline scale data;
   displaying said video frame image;
   identifying one or more points of interest on said video frame image and a predetermined baseline point from a said baseline scale data; and,
   calculating at least one distance between two identified points based upon said video image scale and said baseline scale data.

8. A method as claimed in claim 7 wherein said baseline scale data is obtained by measuring at least two objects depicted in said video frame image.

9. A method of computer assisted surveying using a video of a control location and a survey area, said control location video including a view of baseline scale data therein and having camera position data associated therewith comprising the steps of:
   converting said baseline scale to a video image scale using said control location video;
   selecting and displaying a survey video frame image of interest from the survey area video;
   identifying one or more points of interest on said survey video frame and a predetermined baseline point from said baseline scale; and,
   calculating at least one distance between two identified points based upon said video image scale and said camera position data.

10. A method of generating a map containing elevational data from an aerial video display that includes a view of at least three known reference points comprising the steps of:
   selecting a first and a second video frame from said aerial video survey, said first and second frames including said view of said three reference points;
   converting pixels in said first frame to a first bandwidth and pixels in said second frame to a second bandwidth;
   manipulating and combining the converted first frame with respect to the converted second frame until at least a first and a second of said three reference points are aligned and combined such that pixel values of the first reference point, as combined, fall within a predetermined bandwidth, said manipulating and combining providing a combined frame of pixel values;
   mapping an elevation corresponding to the elevation of said first reference point to a map frame and further mapping said corresponding elevation to said map frame for groups of pixels falling within a further predetermined bandwidth;
   generating a video image elevation scale based upon a pixel image block deviation in said combined frame about one of said second and third reference points and an actual elevation differential between said first reference point and one of said second and third reference points; and,
   mapping a plurality of elevations for pixels in said combined frame to said map frame based upon said video image elevation scale and said pixel image block deviation identified in said combined frame.

11. A method as claimed in claim 10 wherein said first and second bandwidths represent visually distinguishable colors when displayed and the method includes the step of displaying the combined frame.

12. A method as claimed in claim 10 wherein said pixel image block deviation is determined by optical character recognition of objects represented by pixel image blocks and by comparing spatial deviation between pixel image blocks having different bandwidths.

13. A method as claimed in claim 10 wherein the step of manipulating includes the steps of translating, stretching, compressing and rotating said first frame with respect to said second frame to achieve said alignment of said reference points.

14. A computer system for processing a video recording of a control location and a survey area wherein the control location video segment includes a view of a baseline scale, said computer system also operating on camera position data associated with said control location, the computer system comprising:
   a video player;
   a monitor coupled to said player;
   a controller coupled to said player for selecting and displaying a survey frame of interest from the survey area video segment;
   an operator controlled pointer for identifying at least one point of interest on said displayed survey frame;
   a processor coupled to said pointer, said video player and a memory device, said memory device storing said survey frame, said processor including a calculator for determining the distance between said one point and a video image baseline point corresponding to a predetermined baseline scale video point on said control location video segment.

15. A computer system as claimed in claim 14 wherein said calculator also determines a video image scale based upon said view of said baseline scale and said camera position data, said video image scale utilized by said calculator to determine said distance.

16. A computer system as claimed in claim 14 wherein said processor includes means coupled to said memory, to section, magnify and display via said monitor a portion of said survey frame.

17. A computer system as claimed in claim 14 wherein said pointer includes a touch sensitive surface element for identifying each pixel in said survey frame.

18. A computer system for generating a map containing elevational data from an aerial video survey that includes a view of at least three known reference points comprising:
   a video player;
   a monitor coupled to said player;
   a controller coupled to said player for selecting a first and a second video frame from said aerial video survey wherein both frames include views of said three reference points;
   a processor coupled to said player, monitor, controller and a memory device, said memory device storing said first and second frames, said processor including:
   a converter for transforming pixels in said first and second frames into pixels within a first and second bandwidth, respectively;
   a registration means for aligning said reference points in said first and second frames by spatially altering one of said frames with respect to the other;
   a summer combining the two aligned frames to obtain a composite frame;
   means for mapping an elevation corresponding to the elevation of a first reference point of said three known reference points to a map frame stored in said memory when a pixel value of said first reference point, as combined, falls within a predetermined bandwidth;

a vide elevation scaler correlating pixel image block deviation in said composite frame about one of a second and third of said three known reference points and an elevation differential between said first reference point and one of said second and third reference points; and, further means for mapping a plurality of elevations to said map frame based upon said video image elevation scale and a further plurality of pixel image block deviations in said composite frame.

19. A computer system as claimed in claim 18 including means for displaying, coupled to said memory and said monitor, said composite frame.

20. A computer system as claimed in claim 19 including an operator interactive control for assisting said registration means.

* * * * *